(12) United States Patent
Komatsu et al.

(10) Patent No.: US 8,047,105 B2
(45) Date of Patent: Nov. 1, 2011

(54) MACHINING TOOL AND MACHINING METHOD

(75) Inventors: Hidetoshi Komatsu, Tokyo (JP); Kazuto Ohyama, Tokyo (JP)

(73) Assignee: Koganei Corporation, Tokyo (JP)

( * ) Notice: Subject to any disclaimer, the term of this patent is extended or adjusted under 35 U.S.C. 154(b) by 357 days.

(21) Appl. No.: 12/162,621

(22) PCT Filed: Feb. 8, 2006

(86) PCT No.: PCT/JP2006/302198
§ 371 (c)(1),
(2), (4) Date: Jul. 30, 2008

(87) PCT Pub. No.: WO2007/091321
PCT Pub. Date: Aug. 16, 2007

(65) Prior Publication Data
US 2009/0028651 A1    Jan. 29, 2009

(51) Int. Cl.
*B23B 27/00* (2006.01)
(52) U.S. Cl. .......................................... 82/1.11; 407/66
(58) Field of Classification Search .................... 407/66, 407/116, 113, 118, 120; 82/1.11, 114, 117, 82/121, 172; 409/132
See application file for complete search history.

(56) References Cited

U.S. PATENT DOCUMENTS 1,951,856 A * 3/1934 Balke ............................... 76/115
(Continued)

FOREIGN PATENT DOCUMENTS

JP      60-190504      12/1985
(Continued)

OTHER PUBLICATIONS

International Search Report for PCT/JP2006/302198.
(Continued)

*Primary Examiner* — Boyer D Ashley
*Assistant Examiner* — Sara Addisu
(74) *Attorney, Agent, or Firm* — McCormick, Paulding & Huber LLP (57) ABSTRACT

A machining tool of the present invention is used for finishing an end face having an arcuate cross section on a machined portion of a workpiece. A machining tool 30 has a tool body 31 and a cutting portion 32 provided integrally on a tip of the tool body 31. The cutting portion 32 is formed in substantially semispherical shape, and has a substantially spherical flank 33 and a substantially flat rake 35 joined to the flank 33 via an arcuate cutting edge 34. In the state that the cutting edge 34 abuts the arcuate end face of the rotated workpiece, the arcuate end face is finished using the machining tool 30 by varying the position of the cutting edge 34 abutting the arcuate end face in a circumferential direction.

5 Claims, 7 Drawing Sheets

U.S. PATENT DOCUMENTS

| | | | | |
|---|---|---|---|---|
| 2,181,137 | A | * | 11/1939 | Lambright ............ 407/64 |
| 2,213,015 | A | * | 8/1940 | Parent ............... 30/130 |
| 3,608,407 | A | * | 9/1971 | Hitzemann ............ 82/1.11 |
| 4,373,518 | A | * | 2/1983 | Kaiser et al. ........ 606/916 |
| 4,588,331 | A | * | 5/1986 | Yoshinori ............ 407/36 |
| 4,632,593 | A | * | 12/1986 | Stashko .............. 403/316 |
| 4,725,171 | A | * | 2/1988 | DeTorre .............. 408/213 |
| 4,946,319 | A | | 8/1990 | Lyon et al. |
| 5,078,551 | A | * | 1/1992 | Oomen ................ 407/119 |
| 5,342,151 | A | * | 8/1994 | Friedmann ............ 407/116 |
| 5,346,336 | A | * | 9/1994 | Rescigno ............. 407/104 |
| 5,362,183 | A | * | 11/1994 | Alario et al. ........ 407/119 |
| 7,266,873 | B2 | * | 9/2007 | Okajiima et al. ...... 29/90.01 |
| 7,556,456 | B2 | * | 7/2009 | Yoshinaga et al. ..... 407/118 |
| 2004/0120778 | A1 | * | 6/2004 | Lach et al. .......... 407/107 |
| 2005/0244233 | A1 | * | 11/2005 | Jonsson .............. 407/116 |
| 2006/0120816 | A1 | * | 6/2006 | Morimoto et al. ...... 409/132 |
| 2006/0144198 | A1 | * | 7/2006 | Okajima et al. ....... 82/158 |
| 2008/0080937 | A1 | * | 4/2008 | Hecht ................ 407/42 |

FOREIGN PATENT DOCUMENTS

| | | |
|---|---|---|
| JP | 64-064702 | 3/1989 |
| JP | 3-505428 | 11/1991 |
| JP | 5-29605 U | 4/1993 |
| JP | 2002-286157 | 10/2002 |

OTHER PUBLICATIONS

Office Action issued in corresponding application No. JP 2007-557713 dated Sep. 7, 2010 and attached English translation (4 pages).

* cited by examiner

MACHINING TOOL AND MACHINING METHOD

TECHNICAL FIELD

The present invention relates to a machining tool and a machining method which finish an arcuate end face on a machined portion of a workpiece.

BACKGROUND ART

A pneumatic circuit has a pressure control valve for reducing high-pressure air from a compressor to supply it to an actuator and a proportional control valve for controlling air quantity supplied to the actuator. The pneumatic circuit also has an opening/closing control valve for opening and closing an air passage and a directional control valve for varying an air supply direction. The control valves, such as the opening/closing control valve, used for the pneumatic circuit are of the type to bring a valve element made of rubber or metal into contact with an annular valve seat at a right angle thereto. There are such control valves of the poppet and diaphragm types.

As described in Japanese Patent Application Laid-Open publication No. 2002-286157, in the opening/closing control valve of the diaphragm type, a control valve element, that is, a valve housing, is formed with an inflow passage and an outflow passage, the inflow passage and the outflow passage communicate with each other through a communication hole formed in the valve housing, and the opening end of the communication hole has an annular valve seat. A diaphragm moving to the position in which it is brought into contacts with the valve seat to close the communication hole and to the position in which it moves away from the valve seat to open the communication hole is fitted as a valve member in the control valve element.

In the control valves of the poppet and diaphragm types, used for the pneumatic circuit, in order not to cause air leakage between the valve seat and the valve member in the state that the valve member is in contact with the valve seat, the contact surface of the valve seat needs to be machined at high accuracy. In addition, in the control valve used for the pneumatic circuit, in order not to cause air leakage between the valve seat and the valve member, the valve seat is annularly projected to the valve member and its surface is formed in arcuate shape.

To machine an end face having an arcuate cross section on the annular valve seat of the valve housing, conventionally, after the communication hole is cut into the valve housing a drill, the end face of the valve seat is cut using a cutting tool. As described in Japanese Patent Application Laid-Open publication No. 64-64702, there is a cutting tool for superfine cutting.

DISCLOSURE OF THE INVENTION

To machine the end face of the valve seat so as to have an arcuate cross section, conventionally, the inner peripheral surface of an annular machined portion is cut using a facing tool whose edge is bent in one direction and the outer peripheral surface of the machined portion is cut using another facing tool whose edge is bent in the other direction. When the valve seat formed in arcuate shape is cut in two steps using the two facing tools bent in different directions, level difference is caused on the end face having an arcuate cross section with the result that the surface accuracy cannot be increased. Conventionally, after the arcuate end face is machined using the facing tools, the surface of the arcuate end face is mirror-finished by grinding using a grindstone or electropolishing. To finish the arcuate end face at high accuracy, many steps are required.

When the arcuate end face is cut using the conventional facing tool, always the same cutting portion of the cutting tool abuts the workpiece, resulting in a short tool life. Especially, when the valve seat of the valve housing formed of a material having relatively high hardness like stainless steel is cut in arcuate shape, the tool life is short.

An object of the present invention is to improve the machining accuracy of an arcuate end face cut on a machined portion.

Another object of the present invention is to machine an arcuate end face at a desired accuracy in fewer steps.

A machining tool according to the present invention is a tool for finishing an end face having an arcuate cross section on a machined portion formed in a workpiece, comprising: a tool body; and a cutting portion provided integrally on a tip of the tool body, the cutting portion being formed in substantially semispherical shape and having a substantially spherical flank and a substantially flat rake joined to the flank via an arcuate cutting edge, wherein in the state that the cutting edge abuts the arcuate end face of the rotated workpiece, the arcuate end face is finished by varying the position of the cutting edge abutting the arcuate end face in a circumferential direction.

The machining tool according to the present invention is such that the cutting edge is formed in the range of at least 180° from a curvature center.

The machining tool according to the present invention is such that the cutting edge has about 220° from the curvature center.

The machining tool according to the present invention is such that the tool body has a cylindrical portion having a circular cross-sectional shape and a conical portion provided integrally on the tip of the cylindrical portion, the conical portion being provided integrally with the cutting portion and having a notch portion joined to the rake.

A machining tool according to the present invention is a tool for finishing an arcuate end face on a machined portion formed in a workpiece, comprising: a tool body; and a spherical machining portion provided integrally on a tip of the tool body, wherein in the state that the spherical machining portion abuts the arcuate end face of the rotated workpiece, the arcuate end face is finished by varying the position of the cutting portion abutting the arcuate end face.

A finishing method according to the present invention is a method for finishing an end face having an arcuate cross section on a machined portion formed in a workpiece, comprising the steps of: preparing a machining tool having a tool body and a cutting portion provided integrally on a tip of the tool body, the cutting portion being formed in substantially semispherical shape and having a substantially spherical flank and a substantially flat rake joined to the flank via an arcuate cutting edge; and in the state that the cutting edge of the machining tool abuts the arcuate end face of the rotated workpiece, finishing the arcuate end face using the cutting edge by varying the position of the cutting edge abutting the arcuate end face in a circumferential direction.

A finishing method according to the present invention is a method for finishing an end face having an arcuate cross section on a machined portion formed in a workpiece, comprising the steps of: preparing a machining tool having a tool body and a spherical machining portion provided integrally on a tip of the tool body; a first cutting step which cuts the inner peripheral surface of an arcuate end face on the machined portion using a first facing tool; a second cutting step which cuts the outer peripheral surface of the arcuate end face on the machined portion using a second facing tool; and in the state that the machining portion of the machining tool abuts the arcuate end face of the rotated workpiece, finishing the arcuate end face using the machining portion by varying the position of the machining portion abutting the arcuate end face.

According to the present invention, the semispherical cutting portion provided integrally on the tip of the tool body has a spherical flank and a substantially flat rake joined to the flank via the arcuate cutting edge. The arcuate end face of the workpiece is finished by varying the position of the cutting edge abutting the arcuate end face in a circumferential direction. In this way, the arcuate end face can be continuously finished in one step using one machining tool to increase the machining accuracy of the end face. The arcuate end face is finished by varying the portion of the cutting edge abutting the workpiece, so that the tool life can be maintained long without causing local wear in the machining portion.

According to the present invention, the machining portion provided integrally on the tip of the tool body is spherical, so that the arcuate end face of the workpiece is finished by varying the position of the spherical machining portion abutting the arcuate end face along its spherical surface. In this way, the arcuate end face in which its inner peripheral surface and its outer peripheral surface are cut by the different facing tools can be finished by abutment of the spherical surface of the machining tool to increase the machining accuracy of the end face. The arcuate end face is finished by varying the position of the machining portion abutting the arcuate end face of the workpiece along its spherical surface. The tool life can be maintained long without causing local wear in the machining portion.

BRIEF DESCRIPTIONS OF THE DRAWINGS

FIGS. 4A and 4B are enlarged sectional views of the portion indicated by the reference numeral 4 of FIG. 3, in which FIG. 4A shows the state that an inflow passage, an outflow passage, and a valve housing chamber are machined in a block material constituting the valve housing body and a communication hole is drilled, and FIG. 4B shows the state that an arcuate end face is finished on an annular valve seat;

BEST MODE FOR CARRYING OUT THE INVENTION

Embodiments of the present invention will be described below in detail based on the drawings.

Figure 1:
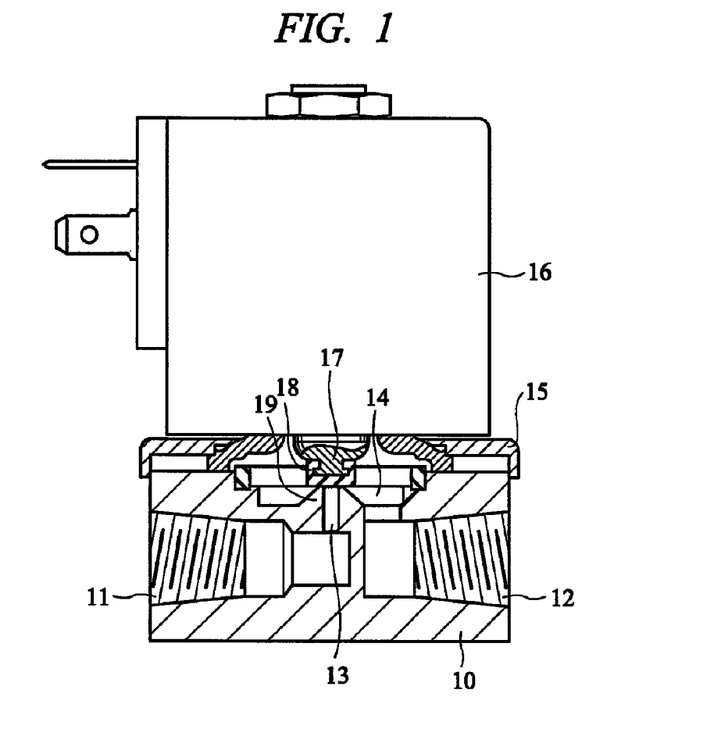
FIG. 1 is a front view, partially broken away, of a control valve.

A valve housing body 10 of a control valve shown in FIG. 1 is formed with an inflow passage 11 and an outflow passage 12. The inflow passage 11 communicates with the outflow passage 12 via a valve housing chamber 14 through a communication hole 13. A housing cover 15 constituting the valve housing together with the valve housing body 10 is fitted to the valve housing body 10. An electromagnet (not shown) is incorporated into a solenoid block 16 fitted to the valve housing via the housing cover 15. A poppet valve 18 made of rubber as a valve element is fitted to a plunger 17 reciprocated in an axial direction by the electromagnet. The poppet valve 18 abuts an annular valve seat 19 provided at the opening end of the communication hole 13 and projected to the valve housing chamber 14. An aperture between the poppet valve 18 and the valve seat 19 is adjusted by current control to the electromagnet. The pressure of compressed air flowing from the inflow passage 11 to the outflow passage 12 is controlled.

Figure 2:
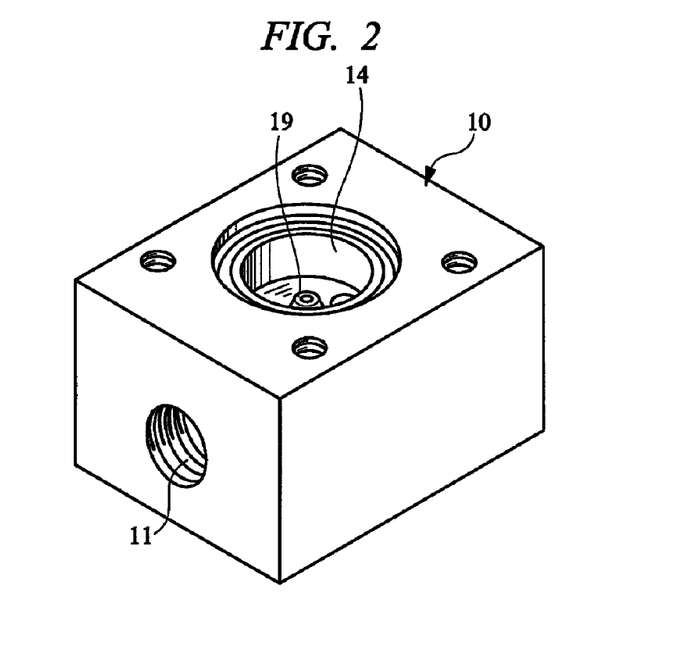
FIG. 2 is a perspective view showing a valve housing body shown in FIG. 1.
Figure 3:
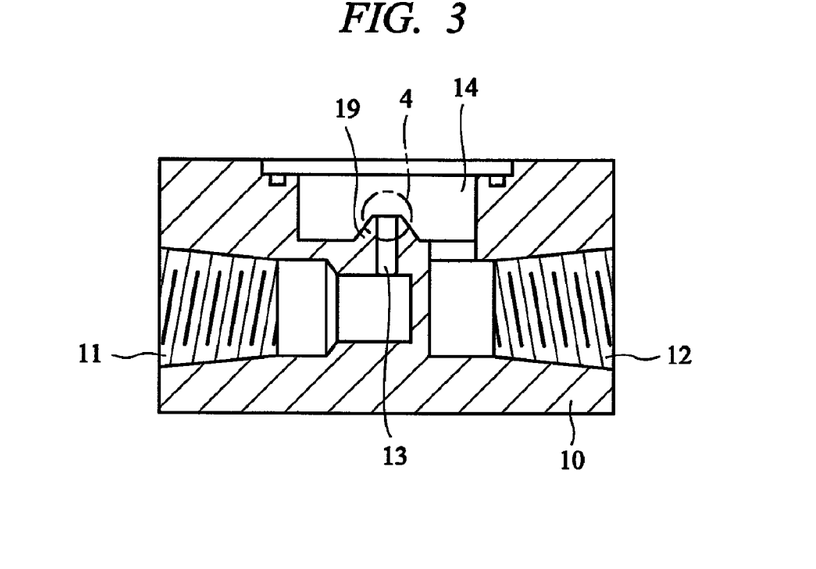
FIG. 3 is a cross-sectional view of the valve housing body shown in FIG. 1.

As shown in FIG. 2, the valve housing body 10 is in substantially rectangular parallelepiped shape. As shown in FIG. 3, the portions corresponding to the inflow passage 11, the outflow passage 12, the communication hole 13, and the valve housing chamber 14 are machined in a block material made of metal to form the valve housing body 10. The illustrated valve housing body 10 is formed of the block material made of stainless steel.

Figure 4A:
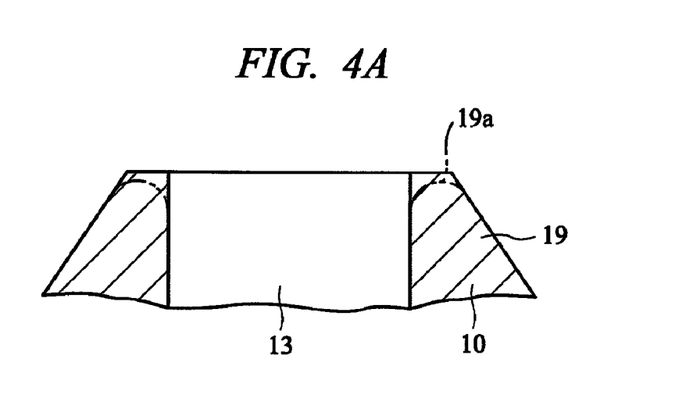
Figure 4B:
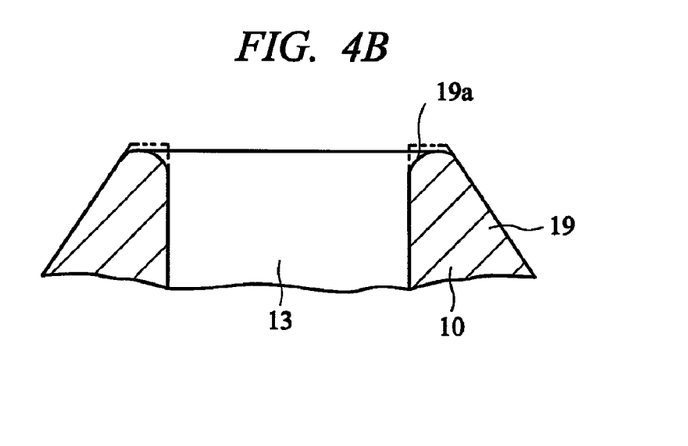

FIGS. 4A and 4B are enlarged sectional views of the portion indicated by the reference numeral 4 of FIG. 3 and show the portion of the valve seat 19 of the valve housing body 10. FIG. 4A shows the state that the inflow passage 11, the outflow passage 12, and the valve housing chamber 14 are machined in the block material constituting the valve housing body 10 and the communication hole 13 is drilled, and FIG. 4B shows the state that an arcuate end face 19a is finished on the annular valve seat 19. In FIG. 4A showing the state before finishing, the portion of the valve seat 19 as an annular machined portion is angular. After finishing, as shown in FIG. 4B, the angular portion is removed by cutting so that the end face of the valve seat 19 has an arcuate cross section.

Figure 5:
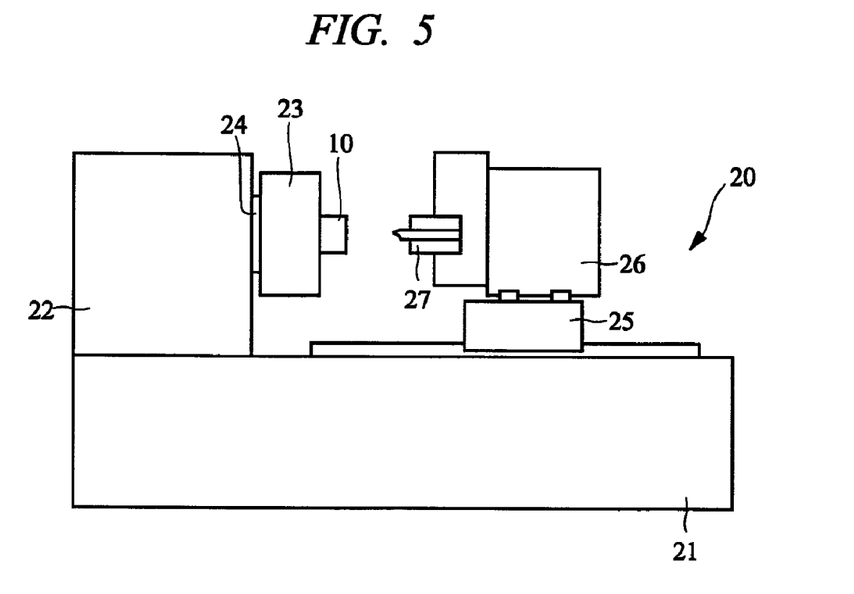
FIG. 5 is a front view showing a lathe for finishing the arcuate end face.

FIG. 5 is a front view showing a lathe 20. The portion constituting the valve seat 19 of the valve housing body 10 with the machined communication hole 13 is used as the annular machined portion. The arcuate end face 19a is finished thereon using the lathe 20.

The lathe 20 has a headstock 22 fixed to a bed 21. A spindle 24 provided with a chuck 23 grasping the valve housing body 10 as the workpiece is rotatably incorporated into the headstock 22. A cross slide 26 is mounted on a carriage 25 movably fitted onto the bed 21 in its longitudinal direction so as to be movable in a direction perpendicular to the carriage 25. A tool rest 27 is fitted in the cross slide 26. A machining tool 30 for finishing is fitted in the tool rest 27.

FIGS. 6 to 7A, 7B, 7C, and 7D show the cutting tool, that is, the machining tool 30, for finishing, as shown in FIG. 4A, the valve seat 19, that is, the annular machined portion, formed in the valve housing body 10 by machining to form the arcuate end face 19a thereon.

The cutting tool, that is, the machining tool 30 for finishing has a tool body 31 and a cutting portion 32 provided integrally on the tip of the tool body 31 and is formed of a cemented carbide. The tool body 31 has a cylindrical portion 31a having a circular cross-sectional shape and a conical portion 31b provided integrally on the tip of the cylindrical portion 31a. The cutting portion 32 is provided integrally on the conical portion 31b. The cutting portion 32 is substantially semi-spherical. The outer peripheral surface in substantially spherical shape of the cutting portion 32 constitutes a flank 33. The substantially flat surface of the cutting portion 32 constitutes a rake 35 joined to the flank 33 via an arcuate cutting edge 34.

Figure 6:
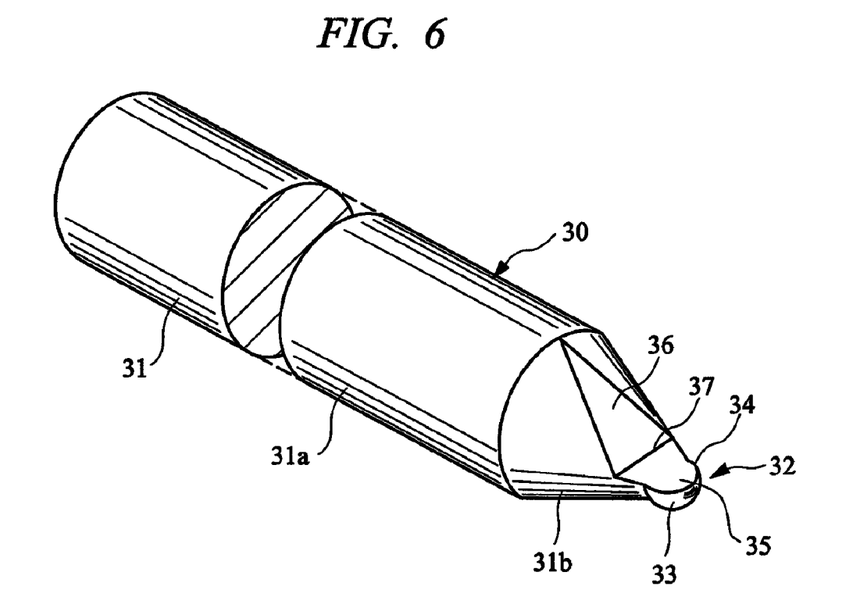
FIG. 6 is a perspective view, partially broken away, showing a machining tool for performing finishing.
Figure 7A:
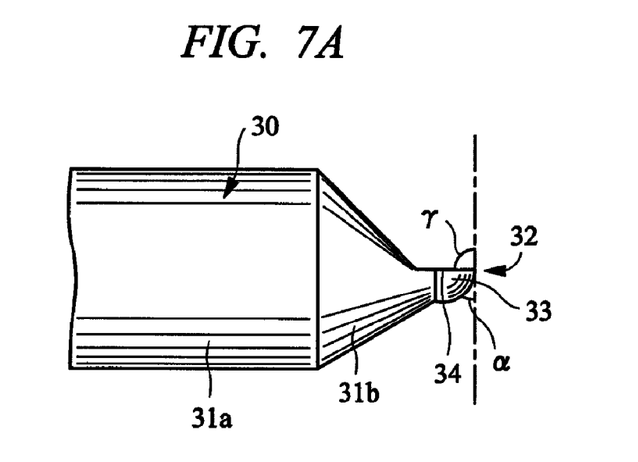
FIG. 7A is a front view showing the tip portion of the machining tool shown in FIG. 6.
Figure 7B:
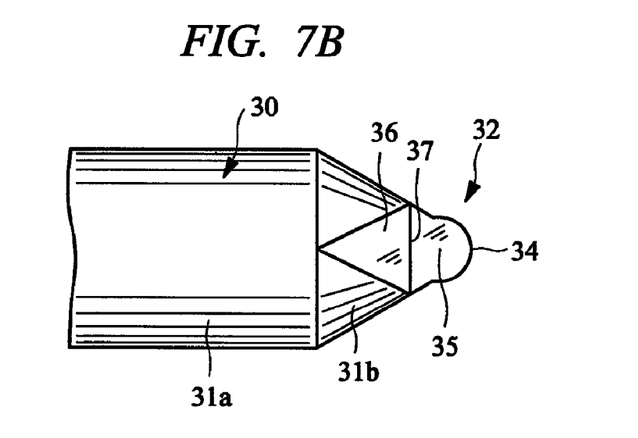
FIG. 7B is a plan view of FIG. 7A.
Figure 7C:
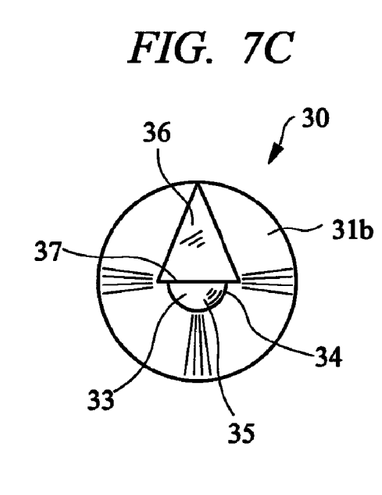
FIG. 7C is a right side view of FIG. 7A.
Figure 7D:
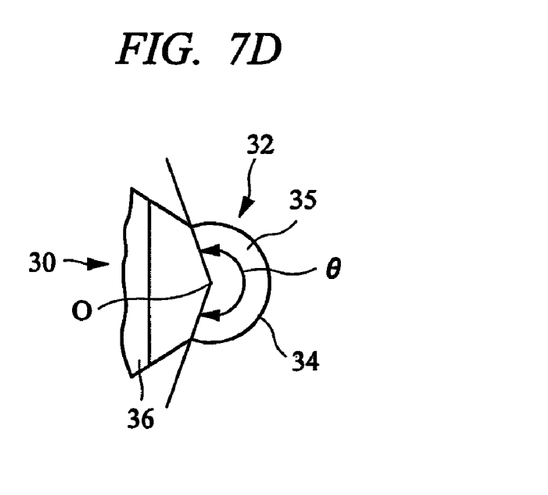
FIG. 7D is an enlarged plan view of the cutting portion shown in FIGS. 7A and 7B.

As shown in FIG. 7D, the cutting edge 34 is formed in the range of an angle θ at its curvature center point O. For illustration, the angle is about 220°. The cutting edge 34 is formed in the range of an angle of 180° or more at the curvature center point O. A notch portion 36 is formed in the conical portion 31b of the tool body 31 and, as shown in FIG. 6, is a triangle flat surface. The flat surface is joined to the rake 35 via a boundary line 37 as the base of the triangle. The cutting edge 34 is formed in the range of about 220° and the flank 33 is spherical. A flank angle α is the same in any position of the cutting edge 34. A rake angle γ is about 90°.

Figure 8A:
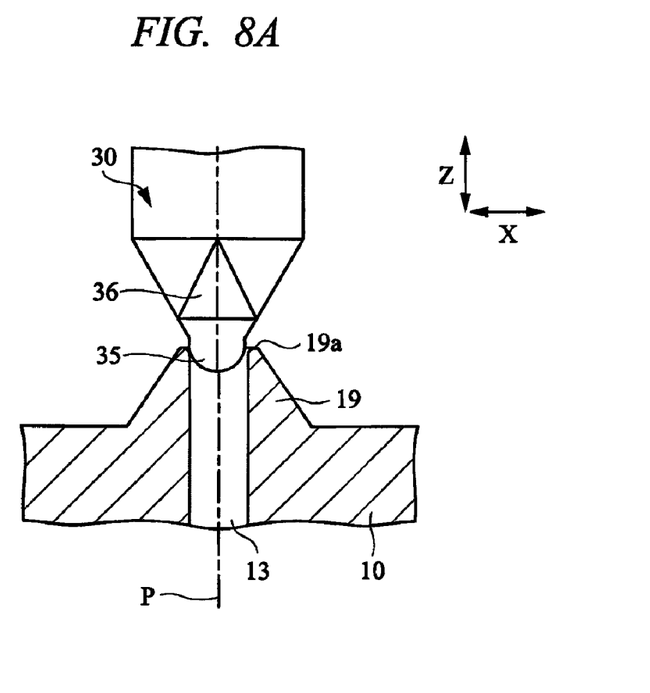
FIGS. 8A and 8B are machining process diagrams showing a machining procedure for finishing the annular machined portion using the machining tool to form the arcuate end face thereon.
Figure 8B:
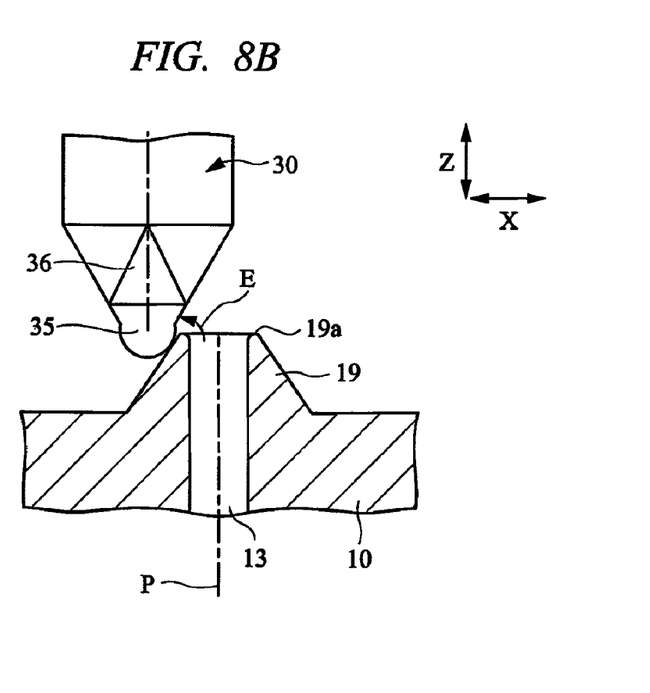

FIGS. 8A and 8B are machining processing diagrams showing a machining procedure for finishing the annular valve seat 19 of the valve housing body 10 using the machining tool 30 shown in FIGS. 6, 7A, 7B, 7C, and 7D to form the arcuate end face 19a thereon. The valve housing body 10 is fitted in the chuck 23 so that a rotation center axis P of the communication hole 13 coincides with the rotation center axis of the spindle 24 of the lathe 20, and is rotatably driven by the spindle 24. The machining tool 30 previously manufactured in the shape shown in FIGS. 6, 7A, 7B, 7C, and 7D is fitted in the tool rest 27 of the lathe 20. The cutting edge 34 of the machining tool 30 abuts the annular valve seat 19.

To finish the end face of the valve seat 19, as shown in FIG. 8A, in the state that the valve housing body 10 is rotated at the rotation center axis P by the spindle 24 of the lathe 20, the cutting edge 34 abuts the inner peripheral surface of the communication hole 13 of the arcuate end face 19a. In the abutment state, the carriage 25 and the cross slide 26 are moved to move the machining tool 30 in the Z direction and the X direction in FIGS. 8A and 8B. As indicated by an arrow E in FIG. 8B, the machining tool 30 is moved until the cutting edge 34 abuts a predetermined position of the outer peripheral surface of the arcuate end face 19a. The arcuate end face 19a can be continuously finished in one step using one machining tool 30. As shown in FIG. 8B, the cutting edge 34 may abut the outer peripheral surface of the arcuate end face 19a, and then, as shown in FIG. 8A, the cutting edge 34 may be moved toward the inner peripheral surface of the communication hole 13 to finish the arcuate end face 19a.

The position in which the cutting edge 34 abuts the arcuate end face 19a of the annular valve seat 19 is varied in a circumferential direction of the cutting edge 34, that is, along the arcuate portion, thereby cutting the arcuate end face 19a. The position in which the cutting edge 34 abuts the workpiece is varied to finish the arcuate end face 19a on the machined portion using substantially the entire cutting edge 34.

In FIG. 7D, the cutting edge 34 is formed so that θ is in the range of at least 180°. The arcuate end face 19a can be finished by varying the position of the cutting edge 34 abutting the workpiece. To prevent the portion other than the cutting edge 34 from interfering with the workpiece, the cutting edge 34 is formed in the range of 180° or more. The end face curved in arcuate shape can be reliably machined.

As shown in FIG. 4A, the communication hole 13 is drilled and, before finishing, in the portion corresponding to the annular valve seat 19 constituting the valve seat 19, the portions of the inside and outside opening ends of the communication hole 13 are angular. The valve seat 19 is machined into the arcuate end face 19a whose corner is rounded in one step by finishing using one machining tool 30 shown in FIGS. 6, 7A, 7B, 7C, and 7D.

The arcuate end face 19a is finished using the machining tool 30 having the arcuate cutting edge 34 by varying the position of the cutting edge 34 abutting the machined portion. The arcuate end face 19a can be continuously finished in one step using one machining tool 30. The entire machined surface can be finished at high accuracy without causing level difference in on the arcuate end face 19a. The position of the cutting edge 34 abutting the machined portion is varied to finish the arcuate end face 19a using substantially the entire arcuate cutting edge 34 without cutting the machined portion using only the specified portion of the cutting edge 34. The durability, that is, the tool life, of one machining tool 30 can be improved without causing local wear in the cutting edge 34.

Figure 9A:
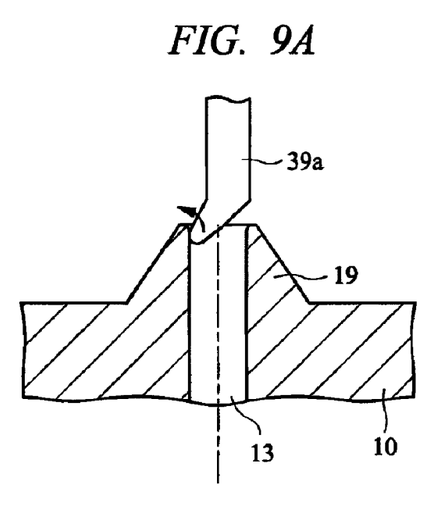
FIGS. 9A, 9B, and 9C are machining process diagrams showing a procedure for machining the arcuate end face on the annular machined portion in two steps using two cutting tools.
Figure 9B:
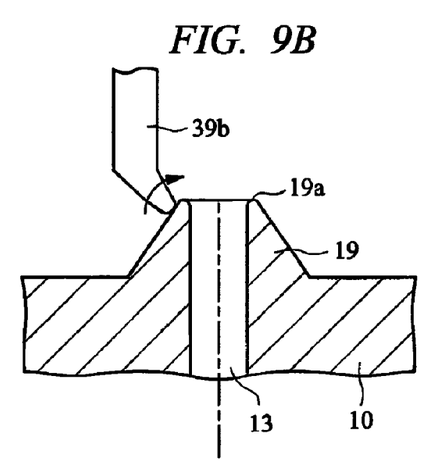
Figure 9C:
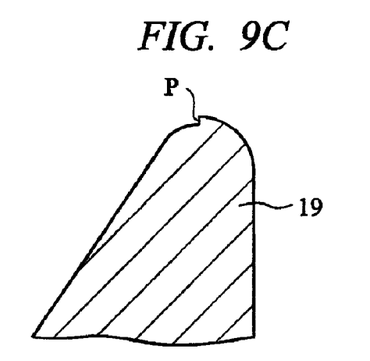

FIGS. 9A, 9B, and 9C are machining processing diagrams showing a procedure for finishing the arcuate end face 19a of the annular valve seat 19 in two steps using two machining tools, unlike the machining tool 30 shown in FIG. 6. To machine the arcuate end face 19a, a first facing tool 39a for cutting the inner peripheral surface of a machined portion as an annular projection portion and a second facing tool 39b for cutting the outer peripheral surface thereof are used. The edges of both the facing tools 39a and 39b are bent in opposite directions. When the arcuate end face 19a is cut in two steps using the two facing tools 39a and 39b, level difference is caused between the surface machined by the facing tool 39a and the surface machined by the facing tool 39b, resulting in reduction in the machining accuracy of the arcuate end face 19a. The level difference is caused on the surface (i.e. the valve seat) abutting the valve member. An aperture is caused between the valve seat and the valve member when the valve is totally closed, thereby leaking a fluid. The aperture when the valve is slightly opened is unstable, causing a very small flow rate to be unstable. On the contrary, when the arcuate end face 19a is finished in one step using the machining tool 30 without finishing it using the facing tools 39a and 39b shown in FIGS. 9A, 9B, and 9C, the arcuate end face 19a can be finished at high surface accuracy.

Figure 10:
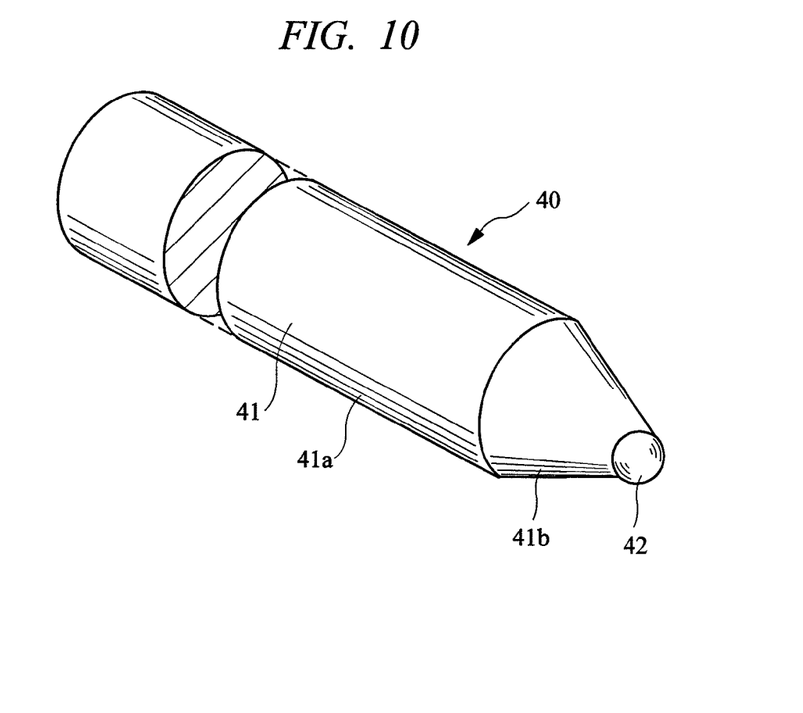
FIG. 10 is a perspective view, partially broken away, showing another machining tool.

FIG. 10 is a perspective view showing another machining tool 40 for finishing the arcuate end face 19a. When the machining tool 40 is used, as shown in FIGS. 9A, 9B, and 9C, the facing tool 39a cuts the inside of the arcuate end face 19a to a P point as the limit of the facing tool 39a. After the facing tool 39a is removed therefrom, the facing tool 39b abuts and cuts the outside of the arcuate end face 19a to the P point as the limit of the facing tool 39b. As described above, the arcuate end face 19a is cut in two steps. The level difference is caused at the P point.

The machining tool 40 has a tool body 41 and a machining portion 42 provided integrally on the tip of the tool body 41 and is formed of a cemented carbide. The tool body 41 has a cylindrical portion 41a having a circular cross-sectional shape and a conical portion 41b provided integrally on the tip of the cylindrical portion 41a. The machining portion 42 is spherical and is provided integrally on the conical portion 41b.

When, as shown in FIGS. 9A, 9B, and 9C, the end face of the annular valve seat 19 is previously machined in arcuate shape using the two facing tools 39a and 39b and the arcuate end face 19a is then finished using the machining tool 40, the two facing tools 39a and 39b and the machining tool 40 are fitted in the turret type tool rest 27. The arcuate end face 19a of the annular valve seat 19 is sequentially machined using the two facing tools 39a and 39b. After the two cutting processes using the two facing tools 39a and 39b are ended, the turret type tool rest 27 is rotated to finish the arcuate end face 19a using the machining tool 40. When the tool rest 27 is not of the turret type, the facing tools 39a and 39b and the machining tool 40 are sequentially fitted in the tool rest 27 to machine the arcuate end face 19a.

When the arcuate end face 19a is finished using the machining tool 40, in the state that the valve housing body 10 as the workpiece is rotated by the spindle 24 of the lathe 20, the position of the spherical machining portion 42 abutting the arcuate end face 19a is varied. The abutment position of the machining portion 42 is varied with proceeding of finishing, thereby preventing the machining portion 42 from being locally worn. The entire spherical surface of the machining portion 42 is worn to increase the tool life. The spherical machining portion 42 of the machining tool 40 abuts and finishes the arcuate end face 19a. Therefore, the surface accuracy of the arcuate end face 19a can be substantially the same as the machining accuracy using the machining tool 30 shown in FIG. 6.

As described above, to finish the arcuate end face 19a at the end of the valve seat 19 as the annular machined portion, there are the method of finishing it in one step using the machining tool 30 and the method of machining the arcuate end face 19a in two steps as shown in FIGS. 9A, 9B, and 9C to finish it using the machining tool 40. In either method, the surface accuracy after finishing can be a desired accuracy. The arcuate end face 19a need not be ground.

Figure 11:
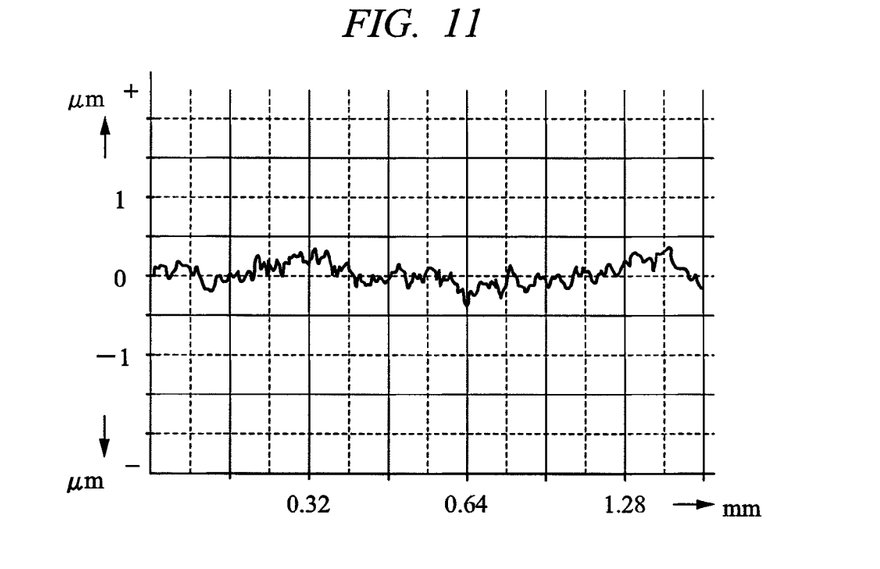
FIG. 11 shows data of the measured results of surface roughness on the arcuate end face finished using the machining tool shown in FIG. 6.

FIG. 11 shows data of the measured results of surface roughness of the arcuate end face 19a finished using the machining tool 30.

A workpiece is the valve housing body 10 shown in FIGS. 2 and 3. A block material made of stainless steel (SUS316) is machined in the illustrated shape. As shown in FIG. 4(A), the end face of the angular valve seat, that is, the annular valve seat 19, is finished into the arcuate end face 19a using the machining tool 30. The inner diameter of the communication hole 13 shown in FIG. 3 is 2 mm. The machining tool 30 in which the radius of the cutting edge 34 from the curvature center O is 0.9 mm is used.

FIG. 11 shows surface roughness in the range of about 1.75 mm of the arcuate end face 19a. Average roughness is about 0.8 μm. Surface roughness desired for a product is 2.5 μm. From the measured results shown in FIG. 11, the machining tool for finishing according to the present invention is used so that the arcuate end face 19a becomes a high accuracy machined surface which fully satisfies the necessary surface roughness.

FIG. 1 shows the pressure control valve. Finishing of the end face of the valve seat formed in the housing is described above. When the end face of the valve seat formed at the opening end of the flow passage is finished, the present invention is applicable to finishing of the end face of the proportional control valve, the opening/closing valve, and the directional control valve. These control valves can be used as, not only a pneumatic control valve, but also to a hydraulic control valve.

The present invention is not limited to the above embodiments and can be variously varied in the scope without departing from the scope. FIGS. 1 to 3 show the valve housing body 10 as the workpiece. The workpiece is not limited to the valve housing body 10. Any workpiece in which an annular portion having in its inside a hole like an end face of a cylindrical body or a circular projection portion is a machined portion, a bar-shaped end is a machined portion, and an end face having an arcuate cross section is finished thereon, can be finished using the machining tools 30 and 40 for finishing.

INDUSTRIAL APPLICABILITY

The present invention is applicable to machining of an end face having an arcuate cross section on a machined portion formed in a workpiece. In particular, the present invention is usefully applicable to finishing of an arcuate end face on an annular valve seat that a valve body abuts.

The invention claimed is:

1. A machining tool for finishing an end face having an arcuate cross section on a machined portion formed in a rotated workpiece, comprising:
 a tool body; and
 a cutting portion provided integrally on a tip of the tool body, the cutting portion being formed in substantially semispherical shape and having a substantially spherical flank and a substantially flat rake joined to the flank via an arcuate cutting edge,
 wherein the cutting edge is formed in the range of at least 180° from a curvature center, and
 in the state that the cutting edge abuts the arcuate end face of the rotated workpiece, the arcuate end face is finished by varying the position of the cutting edge abutting the arcuate end face in a circumferential direction.

2. The machining tool according to claim 1, wherein the cutting edge extends about 220° around the curvature center.

3. The machining tool according to claim 1, wherein the tool body has a cylindrical portion having a circular cross-sectional shape and a conical portion provided integrally on the tip of the cylindrical portion, the conical portion being provided integrally with the cutting portion and having a notch portion joined to the rake.

4. A finishing method for finishing an end face having an arcuate cross section on a machined portion formed in a workpiece, comprising the steps of:
 preparing a machining tool having a tool body and a cutting portion provided integrally on a tip of the tool body, the cutting portion being formed in substantially semispherical shape and having a substantially spherical flank and a substantially flat rake joined to the flank via an arcuate cutting edge; and
 in the state that the cutting edge of the machining tool abuts the arcuate end face of the rotated workpiece, finishing the arcuate end face using the cutting edge by varying the position of the cutting edge abutting the arcuate end face in a circumferential direction.

5. The finishing method according to claim 4, wherein during the finishing step, the flank is out of contact with the machined portion.

* * * * *